July 3, 1951  A. CRESSWELL  2,558,730
METHOD OF PREPARING SHAPED PRODUCTS FROM POLYMERS
AND COPOLYMERS OF ACRYLONITRILE
Filed Sept. 4, 1947

INVENTOR
ARTHUR CRESSWELL,
BY
Harold L. Kauffman
ATTORNEY

Patented July 3, 1951

2,558,730

UNITED STATES PATENT OFFICE 2,558,730

METHOD OF PREPARING SHAPED PRODUCTS FROM POLYMERS AND COPOLYMERS OF ACRYLONITRILE

Arthur Cresswell, Stamford, Conn., assignor to American Cyanamid Company, New York, N. Y., a corporation of Maine Application September 4, 1947, Serial No. 772,200

23 Claims. (Cl. 18—54)

This invention relates to the preparation of shaped products from polymers and copolymers of acrylonitrile. More particularly it is concerned with a method of producing shaped products, for example in the form of filaments (mono- and multifilaments), rods, tubes, films, ribbons, sheets, etc., from a soluble, thermoplastic product of polymerization of a polymerizable mass comprising mainly acrylonitrile.

Various methods of producing filaments, films and other shaped articles from polyacrylonitrile (polymeric acrylonitrile) and from copolymers or interpolymers of a major proportion of acrylonitrile and a minor proportion of another monomer or monomers heretofore have been suggested. For example, in Rein U. S. Patent No. 2,117,210 it is proposed that polyacrylonitrile be dissolved in a quaternary ammonium compound, more particularly a pyridinium compound such as benzyl pyridinium chloride, and that the resulting solution be employed in making films, threads and other shaped bodies therefrom. Also, in Rein U. S. Patent No. 2,140,921 it is proposed that various polyvinyl compounds including polyacrylonitrile and copolymers of acrylonitrile with another vinyl compound be dissolved in concentrated aqueous solutions of inorganic (metal) salts, e. g., the chlorides, bromides, iodides, thiocyanates, perchlorates and nitrates, and that the resulting solutions be used in the manufacture of threads, films, etc. Various organic solvent solutions of polyacrylonitrile and copolymers of at least 85% by weight of acrylonitrile with another monomer are disclosed in U. S. Patents 2,404,713–728, and also the use of such solutions in forming films, filaments, etc., therefrom. In most of these latter patents the aforementioned Rein patents are referred to, as well as the difficulties encountered when effort was made to produce useful filaments and other shaped articles from polyacrylonitrile solutions of the kind proposed by Rein.

The present invention is based on my discovery that useful films, filaments, threads and other shaped articles, which are capable of being dyed, can be produced from acrylonitrile polymerization products of the kind described broadly in the first paragraph of this specification, and more specifically in the aforementioned patents as well as hereinafter, by precipitating or coagulating the polymerization product in approximately its desired shape from a water-coagulable solution thereof (e. g., concentrated aqueous salt solutions of the kind disclosed by Rein in his Patent No. 2,140,921), the precipitation being effected by contacting the said solution with a cold liquid coagulant comprising water, more particularly such a coagulant which is at a temperature not substantially exceeding +10° C. This coagulant is a non-solvent for the polymerization product but will dissolve the solvent in which the said product is dissolved. Surprisingly it was found that by keeping the temperature of the aqueous coagulating bath at or below about +10° C., e. g., within the range of −15° C. to +10° C. and preferably at from about −15° C. to about +5° C., the precipitated gels in general are clear or substantially clear, tough, ductile and, in filament, thread or other form, can be stretched to orient the molecules, thereby increasing the cohesiveness, tensile strength, toughness, resilience and otherwise improving the properties of the finished product. In marked contrast, if temperatures materially above +10° C. be employed, e. g., temperatures of the order of 20° to 50° C. or higher, the precipitated gels in general are hazy or opaque, weak, friable, have little or no toughness or ductility and are not adapted for stretching to orient the molecules and thereby improve the properties of the dried material.

The present invention is based on my further discovery that the shaped precipitated gels, e. g., extruded, water-swollen filaments, which have been formed in a cold liquid coagulant comprising water at a low temperature of the order of that mentioned in the preceding paragraph can be materially improved in properties by subjecting the precipitated material in wet, swollen state to tension, as by stretching, in contact with moisture or water and at an elevated temperature, specifically at a temperature within the range of about 70° C. to about 110° C. Advantageously water at 70° C. to 100° C., preferably at 90° C. to 100° C., is the fluid medium with which the gelled or precipitated fiber or other product is contacted during the stretching operation, but if temperatures above 100° C., e. g., 110° C., are desirable, then an atmosphere of saturated steam may be employed. For optimum results during stretching it is important that moisture or water be present. By thus wet stretching the precipitated product, more particularly to an extent at least twice its original length (that is, at least 100%) and preferably from 3 to 20 or 30 or more times its original length, the molecules are oriented along the fiber axis and a product having increased tensile strength, pronounced fibrillation, toughness, resilience and other improved properties is obtained.

The novel features which are characteristic of my invention are set forth in the appended claims. The invention itself, however, will best be understood by reference to the following more detailed description when considered in connection with the accompanying drawing in which

In carrying my invention into effect a polymer or copolymer of acrylonitrile is first prepared in accordance with methods now well known to those skilled in the art. In the preparation of copolymers a mixture of monomers comprising mainly, that is, a preponderant proportion by weight of, acrylonitrile is employed, and preferably the acrylonitrile constitutes at least about 85% by weight of the mixture of monomers. If less than about 50% by weight of acrylonitrile be present in the mixture of monomers, the full advantages of the invention are not obtained when processing the resulting copolymer in accordance with the invention. The monomeric mixture therefore should contain substantially more than 50% by weight of acrylonitrile, e. g., from 55 to 99.5% by weight of acrylonitrile. Illustrative examples of monomers which may be copolymerized with acrylonitrile in proportions such as have been mentioned above to form a copolymer, more particularly a thermoplastic copolymer, are compounds containing a single $CH_2=C<$ grouping, for instance the vinyl esters and especially the vinyl esters of saturated aliphatic monocarboxylic acids, e. g., vinyl acetate, vinyl propionate, vinyl butyrate, etc.; acrylic and alkacrylic acids (e. g., methacrylic, ethacrylic, etc.) and esters and amides of such acids (e. g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; and numerous other vinyl, acrylic and other compounds which are copolymerizable with acrylonitrile to yield thermoplastic copolymers. Alkyl esters of alpha,beta-unsaturated polycarboxylic acids also may be copolymerized with acrylonitrile to form copolymers which are useful in practicing the present invention, e. g., the dimethyl, -ethyl, -propyl, -butyl, etc., esters of maleic, fumaric, citraconic, etc., acids.

A suitable method of polymerizing the monomeric acrylonitrile or mixture of monomers is in an aqueous emulsion using a suitable polymerization catalyst, e. g., ammonium persulfate. Other polymerization methods, however, also may be employed, e. g., methods such as those described in Bauer et al. U. S. Patent No. 2,160,054. The polymeric or copolymeric acrylonitrile may be of any suitable molecular weight, but ordinarily will be within the range of 15,000 to 300,000 or higher, as calculated from viscosity measurements using the Staudinger equation (reference: U. S. Patent No. 2,404,713).

The polymeric or copolymeric acrylonitrile is then dissolved in a solvent from which the polymer (or copolymer) is precipitated or coagulated when the solution is brought into contact (e. g., immediately after extrusion) with water, more particularly water which is at a temperature not exceeding substantially $+10°$ C., preferably at or below $+5°$ C., e. g., at from $-10°$ C. to $+5°$ C. Examples of such solvents are concentrated aqueous solutions of water-soluble inorganic salts, more particularly such salts which yield highly hydrated ions in aqueous solution, e. g., the chlorides, bromides, iodides, thiocyanates, perchlorates and nitrates, which salts are disclosed in the aforementioned Rein Patent No. 2,140,921 and the concentrated aqueous solutions of which are the preferred solvents for the polymeric and copolymeric acrylonitrile in carrying the present invention into effect. Saturated or nearly saturated aqueous solutions of such salts in some cases may be used. More specific examples of such water-soluble inorganic salts are zinc chloride, calcium chloride, lithium bromide, cadmium bromide, cadmium iodide, sodium thiocyanate, zinc thiocyanate, aluminum perchlorate, calcium perchlorate, calcium nitrate, zinc nitrate, etc. Other examples of suitable solvents are concentrated aqueous solutions of guanidine thiocyanate, the mono-(lower alkyl)-substituted guanidine thiocyanates and the symmetrical and unsymmetrical di-(lower alkyl)-substituted guanidine thiocyanates. These solutions containing dissolved polymeric or copolymeric acrylonitrile are more fully described and are specifically claimed in my copending application Serial No. 772,201, filed concurrently herewith, now Patent No. 2,533,224, issued December 12, 1950.

Figure 1:
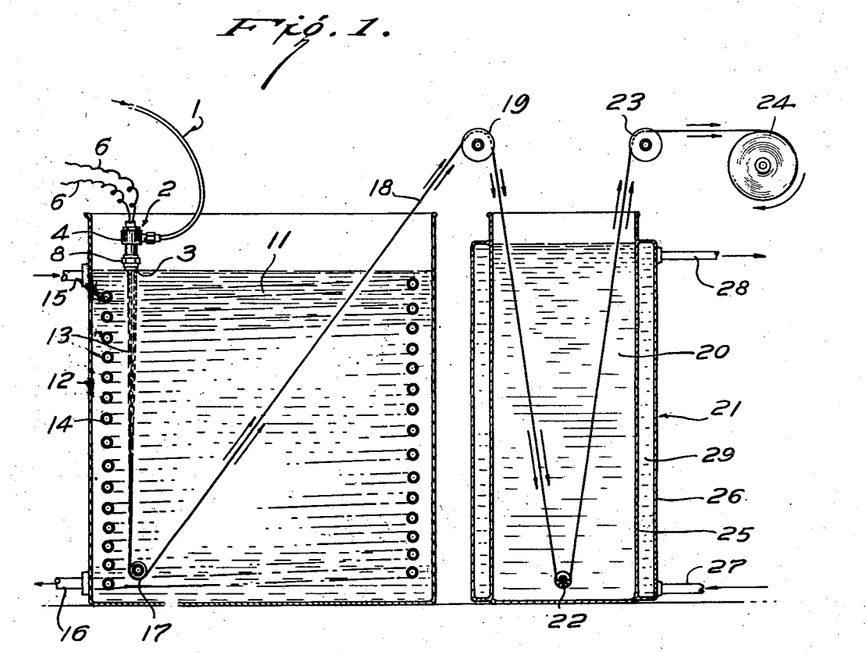
Fig. 1 is a diagrammatic view of one form of apparatus that may be used in practicing the invention, and illustrative thereof.
Figure 2:
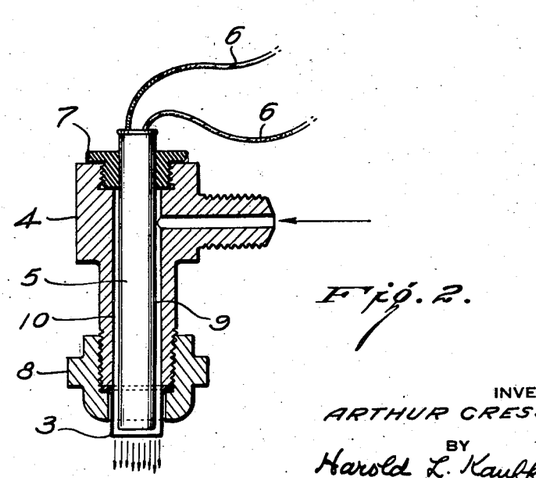
Fig. 2 is an enlarged view, partly in section, of a portion of the apparatus shown in Fig. 1.

With reference to the drawing, a water-coagulable solution of the polymeric or copolymeric acrylonitrile, which has been filtered (if necessary) and de-aerated, is passed under pressure from a supply reservoir (not shown) through the conduit 1 into a spinnerette coupling or heading 2, which preferably is designed so that the solution can be heated, e. g., by electrical or other means, prior to extrusion through the spinnerette 3. A suitable design of a spinnerette coupling, which is heated by electrical means, is shown in Fig. 2. The device there illustrated, and which is broadly and specifically claimed in my copending, divisional application Serial No. 205,778, filed January 12, 1951, comprises a male coupling 4 in which is annularly spaced an electrically heated cartridge 5 provided with lead-in wires 6. This cartridge advantageously may be fitted in the male coupling 4 by means of a liquid-tight plug 7. The cartridge 5 is so positioned as to project beyond the lower end of the male coupling 4 and into the cup of the spinnerette 3, which is attached by means of female coupling 8. The solution being charged through conduit 1 passes annularly between the outer wall 9 of the cartridge 5 and the inner wall 10 of the male coupling 4 and thence into the spinnerette 3. Since the electrically heated cartridge projects into the cup of the spinnerette, the solution is maintained at an elevated temperature prior to extrusion. The temperature of the solution may be varied as desired or as conditions may require, but ordinarily will be within the range of 60° C. to 100° C. By heating the solution immediately prior to extrusion, its viscosity is materially reduced and a substantial reduction in operating pressure is effected. Furthermore, by increasing the fluidity of the solution at the point of extrusion, the water-swollen or gelled filaments can be pulled from the spinnerette at a greater speed, thereby increasing the amount of filament that can be produced from a particular unit.

The spinnerette coupling 2 may be held by suitable means (not shown) above the cold aqueous coagulating or precipitating bath 11 in vessel 12 at any convenient angle. Good results have been obtained by positioning the coupling vertically as shown in Fig. 1 so that only the face of the spinnerette contacts the coagulating bath.

As the solution is forced under pressure through the openings in the spinnerette, it coagulates or precipitates in the form of solid, water-swollen filaments 13 upon entering the aqueous coagulating bath 11, which is maintained at a temperature not exceeding substantially $+10°$ C. by any suitable means. For example, as shown in Fig. 1, cooling coils 14 through which is circulated a liquid coolant, e. g., a refrigerated brine solution, may be employed to maintain the bath 11 at the desired low temperature. This coolant may be introduced through conduit 15 and withdrawn through conduit 16. It will be understood, of course, that various other means may be used to keep the bath 11 at or below $+10°$ C. For example, instead of employing cooling coils as shown, I may add ice alone, or a mixture of ice and sodium chloride or other salt, or ice and methyl or ethyl alcohol to the bath of liquid coagulant comprising mainly water thereby to reduce the temperature of the bath to the desired point.

The coagulated monofilaments or multifilaments pass through the cold aqueous bath 11, which preferably is of the circulating type so that the filaments will be washed substantially free of salt during passage through the bath. A guide roll or sheave 17 facilitates the passage of the filaments through the coagulating bath.

From the foregoing description it will be seen that a specific embodiment of my invention is a method of producing an extruded or otherwise shaped, transparent gel from a viscous, water-coagulable solution of a soluble, thermoplastic product of polymerization of a polymerizable mass comprising mainly acrylonitrile, more particularly at least about 85% by weight of acrylonitrile, which method comprises heating the said solution at an elevated temperature sufficiently high to reduce its viscosity, forming (e. g., by extrusion) the solution while thus being heated into substantially the shape of the final product, and immediately immersing the resulting mass in a liquid coagulant comprising water, which coagulant is at a temperature not exceeding substantially $+10°$ C., more particularly within the range of $-15°$ C. to $+10°$ C., e. g., $0°$ C. to $+5°$ C.

It is important that the coagulating bath 11 be at a temperature not exceeding substantially $+10°$ C., and preferably at or below about $+5°$ C., e. g., $-10°$ C. to $0°$ or $+1°$ or $+2°$ C. Temperatures below $-15°$ C., e. g., $-20°$ C. or lower, may be employed if desired, but such temperatures are more costly to secure and maintain, and no particular advantages appear to accrue therefrom. By the use of a low-temperature aqueous coagulating bath as herein described, the shaped coagulated or precipitated material, e. g., an extruded, water-swollen or gelled filament or thread, is clear (transparent) or substantially clear, cohesive, has considerable elasticity and toughness, and is capable of being oriented, e. g., by stretching. In marked contrast, when the aqueous coagulating bath is substantially above $+10°$ C., e. g., $+20°$ C. or $+25°$ C. or higher, the resulting filament or thread usually either is opaque or shows considerable haze, is spongy and has little or no mechanical strength. Furthermore, it is either unstretchable or has a low order of stretchability, yielding on drying a brittle filament or thread which can not be used for textile purposes.

Furthermore, when multifilaments are produced with the aid of a low-temperature coagulating bath as herein described, the individual water-swollen filaments show no tendency to stick together. This was quite surprising and unexpected, as was also the fact that the swollen or gelled products could be washed substantially free of salt without difficulty, even in a cold coagulating bath, especially in view of the fact that these discoveries are directly contrary to the prior art teachings. For example, in Patent No. 2,404,716 and in numerous other patents it is stated that its has been found substantially impossible to use the solutions proposed in Rein Patent No. 2,140,921 in the production of yarns and films, and that their extrusion into coagulating baths, including such non-solvents for polyacrylonitrile as water, dilute acid solutions, dilute salt solutions, etc., results in the formation of shaped articles that contain large amounts of the inorganic salt component of the solvent. The prior art also teaches that these salts are distributed throughout the structure, that the latter possesses poor physical properties and that the removal of these salts, when possible, results in the formation of a porous, spongy, weak, undesirable structure that is very brittle and completely unsuited for use as a yarn or film. The prior art further teaches that when an attempt is made to form a multifilament yarn by extruding an aqueous sodium sulfocyanide (sodium thiocyanate) polyacrylonitrile composition into a dilute acid bath, the individual filaments that are obtained stick together to form an essentially monofilament structure which is extremely brittle and cannot be bent or worked without breaking. In marked contrast, the films, filaments and other shaped products obtained by practicing my invention are substantially free from salts, are tough and ductile even when first coagulated in the spinning or precipitating bath, and the individual filaments show no tendency to stick together when extruded through a spinnerette into the cold aqueous bath.

The spun filaments, e. g., in the form of a thread cr strand 18, are preferably treated after leaving the coagulating bath in order to orient the molecules and thereby to increase the tensile strength and otherwise to improve the properties of the spun material. Orientation is preferably effected by stretching the thread or strand, while still in its water-swollen or gel state, in the presence of moisture and at a temperature within the range of about $70°$ C. to $110°$ C., more particularly at a temperature of about $90°$ C. to about $100°$ C. This stretching may be effected, for example, in the manner illustrated in Fig. 1. As there shown the thread or strand 18 after leaving the aqueous coagulating bath 11 passes over the revolving wheel or godet 19 into the hot aqueous bath 20 contained in vessel 21, thence over the guide roll or sheave 22, over the godet 23 and finally is wound on the spool 24. The revolving wheels or godets 19 and 23 have increasing peripheral speeds so that a tension is applied to the strand as it passes through the bath 20 and as it is wound on the spool 24. Instead of winding upon a spool the stretched strand may be collected in a centrifugal pot, whereby twist is advantageously applied to the wet strand or thread. The amount of stretch that is applied to the water-swollen filament or strand may be varied widely, but in all cases should be sufficient to cause at least appreciable orientation of the molecules and an improvement in the properties of the material undergoing treatment. The amount of tension to which the strand is subjected obviously should not be so great as to cause the strand to break. Depending, for example, upon the type of material being stretched and the particular properties desired in the finished product, the amount of stretch may vary, for instance, from 100%, preferably from 200 or 300%, up to 4000% or more of the original length of the filament or strand. The highly stretched product is strong, tough, pliable, shows a high degree of orientation along the fiber axis by X-ray diffraction methods, is readily fibrillated, and can be tied into a knot without breaking.

The hot aqueous bath 20 is preferably water, and it may be heated to the desired temperature, e. g., 70° to 100° C., by any suitable means. One means of heating this bath is shown by way of illustration in Fig. 1. As there shown, the vessel 21 is provided with a jacket 29 defined by the walls 25 and 26 through which jacket a heating fluid, e. g., superheated steam, hot mineral oil, etc., is circulated, the heating fluid being introduced into the jacket through conduit 27 and leaving through conduit 28. Electrical or other means also may be used to heat the bath 20. For instance, saturated or superheated steam may be introduced directly into the water through perforated pipes in order to heat the water. Preferably the water in the bath is replaced by fresh water either continuously or intermittently so as to keep to a minimum the amount of salt therein.

From the foregoing description it also will be seen that other specific embodiments of my invention include the method which comprises (1) extruding, e. g., in the form of a filament, rod, sheet, ribbon, etc., a viscous, water-coagulable solution of a solid product of polymerization of a polymerizable mass comprising mainly acrylonitrile, more particularly at least about 85% by weight of acrylonitrile, the said polymerization product being dissolved in a solvent of the kind aforementioned, for instance, a concentrated aqueous solution of a water-soluble metal salt which yields highly hydrated ions in aqueous solution, e. g., zinc chloride, sodium thiocyanate, calcium thiocyanate, etc., (2) immediately after extrusion immersing the extruded mass in a liquid coagulant comprising mainly water, which coagulant is at low temperature as hereinbefore set forth, for instance at a temperature within the range of −15° C. to +10° C., e. g., about 0° C. to +5° C., thereby to obtain an extruded transparent gel having considerable elasticity and toughness, and (3) stretching the extruded transparent gel as hereinbefore described, e. g., while passing through water maintained at a temperature of about 90° C. to 100° C. Preferably the extrudable solution is heated at an elevated temperature sufficient'y high to reduce its viscosity, e. g., at about 60° C. to about 100° C., and the solution is extruded, e. g., in the form of a filament, while thus being heated thereby to obtain a swollen or gelled filament or other shaped body having considerable (marked) elasticity and toughness. Thereafter the swollen filament, thread, yarn, rod, sheet, ribbon or other structure is subjected to tension as hereinbefore described to obtain an oriented body. For instance, a swollen monofilament or multifilament may be elongated at least about 100%, e. g., from 200 to 4000% or more while passing through water maintained at a temperature of 90° C. to 100° C. thereby to obtain a filament having increased strength and toughness and which shows orientation along the fiber axis when examined by X-ray diffraction methods.

It will be understood, of course, that my invention is not limited to the production of monofilaments or to multifilament threads or strands as hereinbefore described. For example, the water-coagulable solution of the polymeric or copolymeric acrylonitrile may be extruded in the form of rods, bars, tubes, straws, thin sheets or ribbons, etc., into a cold aqueous coagulating bath, the temperature of which does not exceed substantially +10° C., and the precipitated product then may be subjected to tension, e. g., by wet stretching as above described, in order to improve its properties. Or, a cast film may be produced, for example by applying to a metallic or other base, e. g., a metal roll, a coating of a viscous, water-coagulable solution of the polymerization product, contacting the coated base with a cold liquid coagulant comprising water thereby to form a solid, removable film of a gel of the polymerization product on the base, and then removing the film from the base. The liquid coagulant should be at a temperature not substantially exceeding +10° C., e. g., from −15° C. to +5° or +10° C. The film of gelled material obtained in this way is transparent or substantially so, has considerable (marked) elasticity and toughness, and can be wet stretched under tension in a manner similar to that described above with reference to the stretching of a filament or thread in order to increase its tensile strength and other properties. The wet-stretched product has a permanent orientation. For example, a film of gelled polyacrylonitrile which had been stretched 2000% of its original length showed a shrinkage of only 6 to 8% after immersion in boiling water for 15 minutes.

It also will be understood by those skilled in the art that the solution of the polymeric or copolymeric acrylonitrile in the chosen solvent should be of such a concentration that a composition having a workable viscosity is obtained. The concentration of the polymerization product will depend, for example, upon the particular solvent and extrusion apparatus employed, the type of shaped article to be formed and the molecular weight of the polymerization product, which usually is within the range of 15,000 to 300,000, as calculated from viscosity measurements using the Staudinger equation, and advantageously is of the order of 35,000 or 40,000 to 140,000 or 150,000. The concentration of polymer or copolymer may range, for example, from 7 or 8% up to 18 or 20% by weight of the solution. The viscosity of the solution, as determined by measuring the time in seconds for a Monel metal ball ⅛ inch in diameter, to fall through 20 cm. of the solution at 61° C., may be, for instance, from 10 to 500 seconds. It has been found that the best casting or spinning solutions from the standpoint of coagulation and the optimum properties of the precipitated gel are those which contain the highest concentration of polymer and the lowest concentration of zinc chloride, sodium or calcium thiocyanate or other salt of the kinds aforementioned, which concentrations are consistent with solubility and viscosity limitations. A concentration of 15% polymeric or copolymeric acrylonitrile in 50–60% sodium or calcium thiocyanate solution has been found to give very satisfactory results. The viscosity of the solution should not be so high that it is difficult to filter or to stir and de-aerate prior to use.

From the foregoing description it will be seen that the temperature of the aqueous coagulating bath is critical in the formation of a useful, workable, polymeric or copolymeric acrylonitrile film, filament or other structure. When the polymerization product is coagulated in water at a temperature substantially above +10° C., e. g., at 20° or 25° C. or higher, an opaque, weak, non-ductile structure results. This structure becomes increasingly weak and less transparent the higher the temperature of coagulation above about +10° C. However, by coagulating in a liquid coagulant comprising water at or below +10° C., e. g., in water at +1° to +5° C., or in an alcohol-water mixture at lower temperatures, e. g., at 0° to −10° C., the coagulated product is clear or substantially clear, cohesive, tough, ductile and capable of being oriented in its water-swollen or gel state. Generally speaking, the clearer the gelled or coagulated material, the greater its ductility. After coagulation and washing, the product contains at the most only a barely detectible amount of salt from the salt solution used as a solvent and is substantially homogeneous in nature.

I am unable to state with certainty the reasons why the use of a cold aqueous coagulating bath as herein described causes such a surprising change in the properties of the coagulated polymeric or copolymeric acrylonitrile. One logical explanation is that the low-temperature coagulation or precipitation of the shaped polymerization product results in the formation of a highly hydrated structure, possibly with water molecules held by secondary forces to the nitrile groups. Once this structure has been formed at low (subnormal) temperatures of the order of −15° C. to +10° C. it is quite stable when preserved under water at temperatures as high as 50° C., although coagulation or precipitation at temperatures materially above +10° C. results in a non-transparent, weak gel having little or no ductility. The hydrated structure obtained by practicing my invention might be illustrated graphically, in the case of polymeric acrylonitrile, as shown below:

where X represents molecules of water. This hydrate water is believed to function as a plasticizer during the stretching operation and also as a preservative of the swollen structure so that, if desired, the product can be dyed either after coagulation and before stretching or after the stretching step.

One of the main advantages accruing from my invention is that it makes possible the effective dyeing of shaped polymers and copolymers of acrylonitrile. The production of such dyed polymerization products is more fully described and is specifically claimed in my copending application Serial No. 772,202, filed concurrently herewith, and now abandoned in favor of my copending application Serial No. 182,296, filed August 30, 1950, as a continuation-in-part of said application Serial No. 772,202.

In some cases, for example when the shaped gel is not to be dyed immediately, it may be desirable to preserve the gel structure of the coagulated polymerization product before it has been irreversibly dried. This may be done, for example, as described in my aforementioned copending application Serial No. 772,202 or as described in the copending application of John D. Pollard Serial No. 772,217, both of which applications are being filed concurrently herewith.

In order that those skilled in the art better may understand how the present invention may be carried into effect, the following examples are given by way of illustration and not by way of limitation. All parts and percentages are by weight.

*Example 1*

Polyacrylonitrile was prepared by the dropwise addition of 62.6 parts of acrylonitrile to a solution of 1 part of ammonium persulfate (catalyst) and 1 part of sodium metabisulfite (activator) in 535 parts of water at 40° C. The polymer, dissolved in 60% sodium thiocyanate solution to have a concentration of 1 gram per 100 ml. of solution at 20° C., gave a solution having a viscosity of 18.5 centipoises at 40° C. To 85 parts of 60% sodium thiocyante solution was added 15 parts of the dry powdered polyacrylonitrile, and the mixture was stirred for 1 hour at 45° C. The polymer dissolved completely in this time.

The 15% solution of polyacrylonitrile was cast on glass plates as a 0.004" thick layer by using a doctor knife. The polymer was then precipitated as a film by immersion of the casting plates in water at various temperatures, more particularly −10° C., 1° C., 10° C., 25° C. and 50° C. Ethanol was added to the −10° C. coagulating bath in order to prevent freezing of the liquid. The stress-strain characteristics were determined on the wet films. The testing conditions were as follows:

Testing machine—Scott incline plane No. 3 tester with 500 gram load on carriage
Specimen length between machine jaws—1.5 inches
Specimen width—0.25 inch
Specimen thickness—see below
Temperature—73° F.

The results are shown below. The values for tensile strength and percent elongation are the averages of two determinations on the specimen of Test No. 1 and of five or six determinations on the remaining specimens.

| Test No. | Coagulation Temperature, °C. | Film Thickness, Mils | Tensile Strength, Lbs. per Square Inch [1] | Elongation, Per Cent |
|---|---|---|---|---|
| 1 | −10 | 5 | 643 | 30 |
| 2 | 1 | 7 | 334 | 41 |
| 3 | 10 | 6.5 | 223 | 39 |
| 4 | 25 | 7 | 126 | 15 |
| 5 | 50 | 6.5 | 67 | 4 |

[1] Based upon the original cross-sectional area before the stress was applied.

It will be noted that there is a very rapid drop in percent elongation in the case of those films which were coagulated at temperatures substantially above 10° C., specifically at 25° C. and at 50° C.

The relative toughness of the films was determined by computing the area under the stress-strain curves. These relative toughness values, uncorrected for the variations in film thickness, were as follows:

| Test No. | Coagulation Temperature, °C. | Relative Toughness |
|---|---|---|
| 1 | −10 | 268 |
| 2 | 1 | 281 |
| 3 | 10 | 146 |
| 4 | 25 | 44 |
| 5 | 50 | 7 |

By stretching under water at 95° C. the wet films showed the following ability to be stretched:

| Test No. | Coagulation Temperature, °C. | Ratio of Stretched Length to Unstretched Length |
|---|---|---|
| 1 | −10 | >8. |
| 2 | 1 | 4. |
| 3 | 10 | 1.5. |
| 4 | 25 | Very little stretchability. |
| 5 | 50 | Unstretchable. |

Analyses of the washed films of Test Nos. 1, 2 and 3 showed only a trace of sodium (about 1 part per million) and no trace of thiocyanate.

In a similar way a film of the same polymer was cast by coagulation in a sodium chloride solution at −6° C., yielding a tough, ductile film. The film was almost as clear as that cast in the water-ethanol mixture at −10° C. and clearer than that cast in water at 1° C.

Example 2

Thirteen and nine-tenth parts of the same sample of polyacrylonitrile as described in Example 1 was dissolved by stirring with 100 parts of a 75% solution of zinc chloride for 75 minutes at 90° C. To this solution was added dropwise with stirring 25 parts of water over a period of 75 minutes, the solution temperature being gradually reduced to 75° C.

The 10% solution of polyacrylonitrile in 60% zinc chloride solution was cast on a glass plate in a manner similar to that described in Example 1. The polymer was then precipitated as a film by immersion in water to which sufficient hydrochloric acid had been added to make it 0.24 normal. This dilute acid prevented the precipitation of basic zinc chloride when the solution was used as a coagulating bath. The temperature of the coagulating bath was varied as shown below.

| Test No. | Coagulation Temperature, °C. | Film Clarity | Physical Properties of Film |
|---|---|---|---|
| 1 | 0 | Perfectly clear | Tough and ductile. |
| 2 | 50 | Opaque | Non-ductile. |

The film cast in acidified water at 50° C. was unstretchable in water at 95° C., whereas the film cast in acidified water at 0° C. could be stretched more than two times its original length. Analysis of the washed and stretched film of Test No. 1 showed only a trace of zinc (about 1 part per million).

Example 3

A copolymer of acrylonitrile and methyl acrylate was prepared by the dropwise addition of a mixture of 162.9 parts of acrylonitrile and 18.1 parts of methyl acrylate to a solution of 0.5 part of ammonium persulfate and 2.0 parts of sodium metabisulfite in 1067 parts of water at 40° C. The copolymer, dissolved in 60% sodium thiocyanate solution to have a concentration of 1 gram per 100 ml. of solution at 20° C., gave a solution having a viscosity of 23.6 centipoises at 40° C. To 85 parts of 55% sodium thiocyanate solution was added 15 parts of the copolymer, and the mixture was stirred for 2 hours at 70° C., at the end of which time the copolymer was completely dissolved. The solution was then de-aerated.

The 15% solution of the acrylonitrile-methyl acrylate copolymer was cast on a glass plate as a 0.004" thick layer by using a doctor knife. The copolymer was then precipitated as a film by immersion in water at the temperatures shown below:

| Test No. | Coagulation Temperature, °C. | Physical Properties of Film |
|---|---|---|
| 1 | 0 | Tough and ductile. |
| 2 | 10 | Do. |
| 3 | 50 | Weak and substantially non-ductile. |

The films of Test Nos. 1 and 2 were clear or substantially clear and could be stretched under water at 90° to 100° to orient the molecules and to increase their tensile strength. In marked contrast the film of Test No. 3 was opaque, could be stretched only slightly without breaking and hence the molecules could not be oriented by stretching as could be done with the other films.

Example 4

A copolymer of acrylonitrile and acrylamide was prepared by first dissolving 198 parts of acrylonitrile in 2232 parts of water, to which was added 189.6 parts of an 11.6% aqueous solution of acrylamide. The temperature of the solution was brought to 40° C. and then 6.6 parts of sodium metabisulfite was added, followed by 0.825 part of ammonium persulfate. By means of a surrounding water bath the temperature of the reaction mixture was held very closely to 40° C. over a 3-hour period. The resulting copolymer of 90% acrylonitrile and 10% acrylamide, dissolved in 60% sodium thiocyanate solution to have a concentration of 1 gram per 100 ml. of solution at 20° C., gave a solution having a viscosity of 23.5 centipoises at 40° C.

One part of the dry, powdered copolymer was stirred with 9 parts of 50% aqueous calcium thiocyanate; the copolymer was completely dissolved after stirring for 6 hours at 25° C. The solution was then de-aerated. The 10% solution of copolymer was cast on a glass plate as a 0.004" thick layer by the use of a doctor knife. The copolymer was then precipitated as a film by coagulation in water at the temperatures shown below. Ethanol was added to the water in the case of the −5° C. coagulating bath.

| Test No. | Coagulation Temperature, °C. | Physical Properties of Film |
|---|---|---|
| 1 | −5 | Tough and ductile. |
| 2 | 1 | Do. |
| 3 | 10 | Do. |
| 4 | 50 | Weak, non-ductile. |

The films of Test Nos. 1, 2 and 3 could be stretched under water at 90° to 100° C. to orient the molecules and thereby to improve their physical properties, while the film of Test No. 4 was so weak and non-ductile that it could not similarly be stretched.

*Example 5*

A copolymer of acrylonitrile and acrylamide was prepared by first dissolving 198 parts of acrylonitrile in 2197 parts of water, to which was added 224.4 parts of a 9.8% aqueous acrylamide solution. The temperature of the solution was brought to 38° C. and then 3.5 parts of sodium metabisulfite was added, followed by 3.5 parts of ammonium persulfate. When surrounded by a water bath at 40° C., the temperature of the reaction mixture increased during the first 20 minutes to 44° C. and then gradually decreased until it was 40° C. at the end of 60 minutes. After continuing the reaction for another 60 minutes at 40° C. the copolymer of 90% acrylonitrile and 10% acrylamide ws filtered off, washed and dried. One gram of this copolymer, dissolved in 60% sodium thiocyanate solution to make 100 ml. at 20° C., gave a solution having a viscosity of 19.2 centipoises at 40° C.

Fifteen parts of the copolymer prepared as described above was dissolved at 45° C. in 85 parts of 55% aqueous sodium thiocyanate to yield a solution having a ball-fall viscosity (as previously described) of 407 seconds at 61° C. After de-aeration and filtering, the solution containing 15% copolymer was extruded through a metal spinnerette having 100 holes, the diameter of the holes being 55 microns. The solution was heated to reduce the viscosity before extrusion by using a steam-heated "finger" inside the spinnerette. Extruding at the rate of 1.53 grams of solution per minute, the filaments were coagulated in water at 5° C. The extruded filaments formed a multifilament thread with complete separation of all of the filaments. The thread was drawn from the spinnerette with 9.5 inches of bath travel to a roller and thence vertically to a godet with a peripheral speed of 1.39 meters per minute. The highly hydrated multifilament thread was clear, tough and ductile. After wrapping the thread 2½ times around the aforementioned godet, the thread was carried through 24 inches of bath travel in water at 98° C. and thence to a second godet with a peripheral speed of 18.5 meter per minute around which the thread was wrapped 2½ times. The peripheral speed of the second godet was 13.3 times that of the first godet. After drying, the stretched thread showed a high order of orientation along the fiber axis, was soft and flexible, had a high tensile strength and could be tightly knotted without breaking.

In another case the solution was extruded in water at −11° C., yielding a multifilament thread similar in properties to that obtained when the extruded material was coagulated in water at 5° C.

*Example 6*

An interpolymer of acrylonitrile and acrylamide was prepared by dissolving 198 parts of acrylonitrile in 2190 parts of water to which had been added 228.5 parts of a 9.64% aqueous acrylamide solution. The temperature of the solution was brought to 40° C. and then 5 parts of sodium metabisulfite was added, followed by 5 parts of ammonium persulfate. By external cooling, the reaction temperature was held to a maximum of 41.4° C., after which the temperature returned to 40° C. at the end of 40 minutes. The mixture was stirred at 40° C. until the total reaction time was 2 hours. The precipitated copolymer of 90% acrylonitrile and 10% acrylamide was filtered off, washed, and dried. One gram of this copolymer, dissolved in 60% sodium thiocyanate to make 100 ml. of solution at 20° C., gave a solution having a viscosity of 17 centipoises at 40° C.

Twelve and two-tenths parts of the dry, powdered copolymer was dissolved in 87.8 parts of 55% aqueous sodium thiocyanate solution. The ball-fall viscosity of the resulting solution at 61° C. was 56 seconds. The filtered and de-aerated solution was extruded through a 40-hole spinnerette with 90-micron holes, the spinerette being attached to an electrically heated coupling; the temperature of the solution inside the spinnerette was 60° C. By contacting the face of the spinnerette with the surface of the coagulating bath, which was water at 4° C., the extruded multifilament thread was spun vertically downward to a roller and thence back to the surface of the coagulating bath, giving a bath travel of 36 inches. The thread was then wrapped 2½ times around a godet, the surface speed of which was 1.38 meters per minute. The thread was then passed through a water bath at 95° C. for a travel of 24 inches and thence to a second godet, the surface speed of which was 17.9 meters per minute; the thread was consequently stretched 13-fold in the hot water. The stretched thread was wound on a bobbin while still wet, and a spray of water was maintained on the bobbin to prevent any drying out of the thread.

A sample of the thread, when dried, was white, lustrous, soft, flexible and could be tightly knotted. Another sample of the thread, still in the wet gel state, was dyed for 5 hours at 39° C. in a dispersion of 0.5 gram per liter of an acetate brown dye. The thread was dyed without difficulty to a satisfactory brown color. Another sample of the same gel-state thread was treated with a 50% aqueous solution of triethylene glycol and thereafter was allowed to dry in air. When dyed under the same conditions as the gel-state sample, a satisfactory depth of dyeing was obtained. By contrast, a sample of the dry thread, which had not been treated with triethylene glycol before drying, remained undyed after 16 hours in the above dye bath.

*Example 7*

To a solution at 40° C. comprising a mixture of 8774 parts of water, 914 parts of a 9.64% aqueous acrylamide solution and 792 parts of acrylonitrile was added with constant stirring 16 parts of sodium metabisulfite followed by 16 parts of ammonium persulfate, each being added as a concentrated aqueous solution. The polymerization was carried out in a jacketed vessel, and by applying cooling during the early stage of the polymerization the temperature of the reaction mixture was held at 40° C. After a total of 2 hours the polymer slurry was filtered, and the isolated copolymer was washed, dried and ball-milled. One gram of the dry copolymer, dissolved in a 60% aqueous sodium thiocyanate solution to make 100 ml. at 20° C., had a viscosity at 40° C. of 21.5 centipoises.

Seven parts of the dry copolymer powder was dissolved in 93 parts of a 50% aqueous calcium thiocyanate solution. After filtering and de-aerating, the solution had a viscosity of 18.5 seconds as determined by the time for a Monel ball, ⅛-inch in diameter, to fall through 20 centimeters of the solution maintained at 61° C.

The solution was extruded through a 40-hole spinnerette with holes of 90 microns diameter into water at 3° C. To assist in the extrusion the solution was heated to 60° C. inside the spinnerette by means of the heating device shown in Fig. 2. The solution was extruded downwardly at a rate of 6.86 grams per minute, and the multifilament thread thereby formed was led first to a hook and thence upwardly to submerged rollers so that the total bath travel was 21 inches. The thread was then led to a godet of 50 mm. diameter, hereafter referred to as G–1, around which the thread was wrapped three times. Thereafter the thread was led to a second godet of 125 mm. diameter, hereafter referred to as G–2, around which it was wrapped two times. G–1 and G–2 both rotated at 16 R. P. M., thereby applying a preliminary stretch of 2½ times to the thread. From G–2 the thread was led through a water bath at 98°–99° C. for a bath travel of 24 inches and thence to a 94.5 mm.-diameter spool which rotated at 81 R. P. M. The stretch between G–2 and the spool was 3.83 times, and the overall stretch between G–1 and the spool was 9.6 times. No difficulties whatsoever were encountered in spinning the solution.

By way of contrast the temperature of the aqueous coagulating bath was first raised to 25° C., no other change in conditions being made. The resulting thread accepted the 2½ times stretch between G–1 and G–2 but immediately broke on being led through the hot water bath. The thread which was delivered from G–2 was brittle after it had been washed and dried and could not be used for textile purposes. The temperature of the aqueous coagulating bath was now raised to 48° C. while still maintaining all other operating conditions the same. The resulting thread broke instantly between G–1 and G–2. The thread which was coagulated at 3° C. was clear on issuing from the coagulating bath, whereas that coagulated at 25° C. was semi-opaque. The thread coagulated at 48° C. was opaque and "cheesy."

The thread obtained by coagulating in water at 3° C., after washing and drying, had a denier of 155. It had a dry tenacity of 3.31 grams per denier with an elongation of 18%. While in the stretched, water-swollen or aquagel state some of the thread was dyed on a spool by circulating a 40° C. dye bath containing an aqueous dispersion of 0.666 gram per liter of an acetate blue dye, more particularly 1,4,5,8-tetraminoanthraquinone, in contact with the thread for 3 hours. A small quantity of highly sulfonated castor oil was used in producing the aqueous dye dispersion. The thread was dyed a satisfactory depth or shade of blue by the treatment. The thread was then treated with an aqueous dispersion of a reaction product of ethylene oxide and octadecyl guanidine, after which it was dried and ring twisted ten turns per inch. The twisted yarn was soft and flexible with no stuck filaments.

With the same spinning arrangement as previously has been described and G–1 and G–2 running at 14 R. P. M. and a third godet designated as G–3, the diameter of which was 125 mm., running at 59 R. P. M., another sample of thread which had been coagulated in the same manner as above set forth was stretched in hot water at 98°–99° C. and taken up by a spool rotating at 78 R. P. M. The applied stretch between G–1 and G–3 was 10.55 times. The resulting dry thread had a denier of 97 and a tenacity of 4.1 grams per denier with an elongation of 14%.

It will be understood, of course, by those skilled in the art that my invention is not limited to the specific polymerization products and solutions thereof shown in the above illustrative examples nor to the specific conditions therein given by way of illustration. Thus, instead of the particular copolymers employed in Examples 3 to 7, inclusive, I may use any other thermoplastic copolymers of a major proportion of acrylonitrile and a minor proportion of another monomer or monomers, numerous examples of which latter have been given hereinbefore. Additional examples of other monomers which may be copolymerized with acrylonitrile in proportions such as previously have been given to obtain thermoplastic copolymers that may be used in practicing the invention claimed in the instant application and, also, the invention claimed in my aforementioned copending application are allyl, methallyl and other unsaturated monohydric alcohol esters of monobasic acids, e. g., allyl and methallyl acetates, laurates, cyanides, etc. Likewise, I am not limited to the particular proportions of copolymerizable monomers as set forth in Examples 3 to 7, inclusive. For instance, instead of using methyl acrylate or acrylamide and acrylonitrile in the particular weight ratios specified in these examples to obtain a copolymer, I may use these copolymerizable ingredients in various other proportions, e. g., in the ratio of, by weight, from about 85 to about 97% of acrylonitrile to from about 15 to about 3% of methyl acrylate or acrylamide, more particularly from about 90 to about 95% of acrylonitrile to from about 10 to about 5% of methyl acrylate or acrylamide.

From the foregoing it will be seen that in practicing my invention I can use, as the starting acrylonitrile polymerization product, a thermoplastic product of polymerization comprising at least about 85% by weight of acrylonitrile.

The process of the present invention is economical to practice, since for one reason the salt employed can be recovered from the aqueous coagulating bath and re-used. Taking calcium thiocyanate as illustrative of the salt used in making the aqueous solution in which the polymeric or copolymeric acrylonitrile is dissolved, such salt can be recovered in the form of a concentrated solution by continuously bleeding out of circulation a portion of the coagulating bath, passing the withdrawn portion through a heat exchanger to cool the make-up water and then charging it to an evaporator system wherein it is evaporated to a concentration of about 48 to 55% for re-use in making fresh spinning solution. Since there is apparently no actual chemical reaction involved in the thread coagulation, thereby differing from viscose or cuprammonium rayon spinning, the consumption of new calcium thiocyanate or other salt is theoretically only that necessary to make up for losses in the thread, that is, for losses due to the carry-over into the stretch bath.

If desired, lubricants, dyes, bleaching agents, plasticizers or pseudo-plasticizers may be incorporated into the shaped polymeric or copolymeric articles at an appropriate stage in their manufacture. A preferred stage at which these various modifiers may be applied is during the gel state of the thread or film. For example, highly stretched multifilament thread may be treated while in this condition with an emulsion of a reaction product of ethylene oxide and octadecyl guanidine alone or in conjunction with an aqueous solution of a polyglycol, e. g., triethylene glycol. In this swollen state the fibers are more receptive to the taking up of an aqueous solution, dispersion or emulsion. Other lubricant or anti-static treatments which may be applied in this manner are emulsions of long-chain β-alkoxypropionitriles, e. g., octadecoxypropionitrile; still another in an emulsion of a reaction product of ethylene oxide and octadecyl guanamine. These lubricants or anti-static compositions may be applied to the gel thread after it has been dyed. Furthermore, fairly good results have been obtained by the application of emulsions of these compositions to the dry thread although, as previously has been mentioned, the gel-state treatment is preferred.

After the spinning operation the wet, aquagel thread may be given a final water wash, if desired, in order to remove any traces of salt that previously may not have been removed from the thread due, for example, to an accumulation of salt in the stretching bath of hot water. In general, subsequent treatments are determined by the form of thread or yarn to be produced. In the case of a pre-dyed thread, a dispersion of an acetate dye may be circulated through the thread package, followed by a water wash and finally by immersion in a bath of an anti-static and lubricating composition or compositions. The thread is then dried and, in the case of bobbin-spun thread or yarn, may then be twisted and wound into packages. Pot-spun yarn may be wound directly. In the case of thread or yarn which is to be dyed later in cloth form, a treating bath containing an aqueous solution of a humectant may be applied to the thread as described in my aforementioned copending application Serial No. 772,202, and now abandoned, as previously has been mentioned, in favor of my copending application Serial No. 182,296, filed August 30, 1950, as a continuation-in-part of said application Serial No. 772,202. The twisted thread is then dried at a temperature and for a time insufficient to convert the gel to an irreversible state, after which it may be twisted and packaged as described above.

The term "filament" as used generically herein and in the appended claims is intended to include within its meaning both monofilaments and multifilaments.

I claim:

1. The method of producing shaped products from a soluble, thermoplastic product of polymerization of a polymerizable mass comprising mainly acrylonitrile, said method comprising precipitating the said polymerization product in approximately its desired shape from a water-coagulable solution thereof by contacting the latter with a liquid coagulant comprising water, said coagulant being at a temperature not exceeding +10° C. and said polymerization product being dissolved in a concentrated aqueous solution of a water-soluble salt which yields highly hydrated ions in aqueous solution, thereby to obtain a shaped, tough gel which can be molecularly oriented by wet stretching.

2. The method of producing shaped products from a soluble, thermoplastic product of polymerization of a polymerizable mass comprising mainly acrylonitrile, said method comprising (1) shaping a viscous, water-coagulable solution of the said polymerization product dissolved in a concentrated aqueous solution of a water-soluble salt which yields highly hydrated ions in aqueous solution, (2) contacting the shaped mass with a liquid coagulant comprising water, said coagulant being at a temperature not exceeding +10° C., thereby to precipitate the said polymerization product from the said solution in gel state, and (3) stretching the precipitated product in the presence of moisture and at a temperature within the range of about 70° C. to about 110° C.

3. The method of producing shaped, stretched gels from a soluble, thermoplastic product of polymerization of a polymerizable mass comprising at least about 85% by weight of acrylonitrile, said method comprising extruding a viscous composition comprising a water-coagulable solution of the said polymerization product into a liquid coagulant comprising mainly water, said coagulant being at a temperature within the range of —15° C. to +10° C. and said polymerization product being dissolved in a concentrated aqueous solution of a water-soluble salt which yields highly hydrated ions in aqueous solution, and stretching the resulting gel in contact with water at a temperature within the range of about 70° C. to about 100° C.

4. The method of producing films and the like from a soluble, thermoplastic product of polymerization of a polymerizable mass comprising at least about 85% by weight of acrylonitrile, said method comprising applying to a base a coating of a viscous water-coagulable solution of the said polymerization product dissolved in a concentrated aqueous solution of a water-soluble salt which yields highly hydrated ions in aqueous solution, contacting the coated base with a liquid coagulant comprising water thereby to form a solid, removable film of a gel of the said polymerization product on the said base, said coagulant being at a temperature within the range of —15° C. to +10° C., removing the said film from the said base, thereafter stretching the film of the gelled polymerization product in contact with moisture and at a temperature within the range of about 70° C. to about 110° C., and drying the stretched film.

5. The method which comprises bringing a viscous, water-coagulable solution containing a thermoplastic product of polymerization of a polymerizable mass comprising at least about 85% by weight of acrylonitrile into contact with a liquid coagulant comprising mainly water, said polymerization product having a molecular weight of between 15,000 and 300,000 and being dissolved in a concentrated aqueous solution of a water-soluble salt which yields highly hydrated ions in aqueous solution, and said coagulant being at a temperature within the range of —15° C. to +10° C., thereby to precipitate the said polymerization product from the said solution as a transparent gel having considerable elasticity and toughness, stretching the said gel while in contact with water at a temperature within the range of about 70° C. to about 100° C. to cause orientation of the molecules of the said polymerization product, and drying the stretched gel.

6. The method which comprises bringing a viscous, water-coagulable solution comprising a polymer of acrylonitrile dissolved in an aqueous solution of a thiocyanate salt into contact with a liquid coagulant comprising water, said coagulant being at a temperature not exceeding +10° C., thereby to precipitate the said polymer from the said solution as a transparent gel having marked elasticity and toughness.

7. The method which comprises dissolving a thermoplastic acrylonitrile copolymer, produced by polymerization of a polymerizable mixture containing at least about 85% by weight of acrylonitrile, in an aqueous solution of a thiocyanate salt thereby to obtain a viscous, water-coagulable solution of the said copolymer, and bringing the said solution into contact with a liquid coagulant comprising water, said coagulant being at a temperature not exceeding +10° C., thereby to precipitate the said copolymer from the said solution as a transparent gel having marked elasticity and toughness.

8. The method of producing a shaped, transparent gel from a viscous, water-coagulable solution of a thermoplastic product of polymerization of a polymerizable mass comprising at least about 85% by weight of acrylonitrile, said polymerization product being dissolved in a concentrated aqeous solution of a water-soluble salt which yields highly hydrated ions in aqueous solution and said method comprising heating the said solution at an elevated temperature sufficiently high to reduce its viscosity, shaping the solution while thus being heated, and immediately immersing the resulting mass in a liquid coagulant comprising water, said coagulant being at a temperature within the range of −15° C. to +10° C., thereby to obtain a shaped, transparent gel.

9. The method which comprises extruding a viscous, water-coagulable solution of a thermoplastic product of polymerization of a polymerizable mass comprising at least about 85% by weight of acrylonitrile, said polymerization product being dissolved in a concentrated aqueous solution of a water-soluble metal salt which yields highly hydrated ions in aqueous solution, immediately after extrusion immersing the extruded mass in a liquid coagulant comprising mainly water, said coagulant being at a temperature within the range of −15° C. to +10° C., thereby to obtain an extruded transparent gel having considerable elasticity and toughness, and stretching the extruded gel at least about 100% while immersed in water at a temperature within the range of about 70° C. to about 100° C.

10. A method as in claim 9 wherein the thermoplastic product of polymerization is polymeric acrylonitrile.

11. A method as in claim 9 wherein the thermoplastic product of polymerization is a copolymer of, by weight, about 90 to about 95% of acrylonitrile and about 10 to about 5% of acrylamide.

12. A method as in claim 9 wherein the thermoplastic product of polymerization is a copolymer of, by weight, about 90 to about 95% of acrylonitrile and about 10 to about 5% of methyl acrylate.

13. A method as in claim 9 wherein the extruded mass is immersed in water at a temperature within the range of about 0° C. to about +5° C.

14. The method which comprises extruding a viscous, water-coagulable solution of a thermoplastic product of polymerization of a polymerizable mass comprising at least about 85% by weight of acrylonitrile, said polymerization product being dissolved in a concentrated aqueous solution of sodium thiocyanate, and immediately after extrusion immersing the extruded mass in a liquid coagulant comprising mainly water, said coagulant being at a temperature within the range of −15° C. to +10° C., thereby to obtain an extruded transparent gel having considerable elasticity and toughness.

15. The method which comprises extruding a viscous, water-coagulable solution of a thermoplastic product of polymerization of a polymerizable mass comprising at least about 85% by weight of acrylonitrile, said polymerization product being dissolved in a concentrated aqueous solution of calcium thiocyanate, and immediately after extrusion immersing the extruded mass in a liquid coagulant comprising mainly water, said coagulant being at a temperature within the range of −15° C. to +10° C., thereby to obtain an extruded transparent gel having considerable elasticity and toughness.

16. The method which comprises extruding a viscous, water-coagulable solution of a thermoplastic product of polymerization of a polymerizable mass comprising at least about 85% by weight of acrylonitrile, said polymerization product being dissolved in a concentrated aqueous solution of zinc chloride, and immediately after extrusion immersing the extruded mass in a liquid coagulant comprising mainly water, said coagulant being at a temperature within the range of −15° C. to +10° C., thereby to obtain an extruded transparent gel having considerable elasticity and toughness.

17. In a method of wet spinning a viscous, water-coagulable solution of a thermoplastic product of polymerization of a polymerizable mass comprising at least about 85% by weight of acrylonitrile, said polymerization product being dissolved in a concentrated aqueous solution of a water-soluble inorganic salt which yields highly hydrated ions in aqueous solution, the improvement which consists in collecting the extruded material in an aqueous coagulating bath maintained at a temperature of about 0° C. to about +5° C. thereby to obtain a tough, aquagel product which, in fiber form, can be elongated at least 100% without breaking while in contact with water at a temperature of from about 70° C. to about 100° C.

18. The method which comprises (1) extruding a viscous, water-coagulable solution of a thermoplastic product of polymerization of a polymerizable mass comprising at least about 85% by weight of acrylonitrile, said polymerization product being dissolved in a concentrated aqueous solution of a water-soluble metal salt which yields highly hydrated ions in aqueous solution, (2) immediately after extrusion immersing the extruded mass in a liquid coagulant comprising mainly water, said coagulant being at a temperature within the range of −15° C. to +10° C., thereby to obtain an extruded transparent gel having considerable elasticity and toughness, and (3) stretching the extruded gel while passing through water maintained at a temperature of 90° C. to 100° C.

19. The method which comprises (1) heating a viscous, water-coagulable solution of a thermoplastic product of polymerization comprising at least about 85% by weight of acrylonitrile at an elevated temperature sufficiently high to reduce its viscosity, said polymerization product being dissolved in a concentrated aqueous solution of a water-soluble thiocyanate, (2) extruding the solution while thus being heated in the form of a filament, (3) immediately after extrusion immersing the extruded filament in a coagulating bath of water maintained at a temperature of about 0° C. to about +5° C., thereby to obtain a swollen filament having considerable elasticity and toughness, and (4) elongating the swollen filament at least about 100% while passing through water maintained at a temperature of 90° C. to 100° C. thereby to obtain a filament having increased strength and toughness and which shows orientation along the fiber axis when examined by X-ray methods.

20. The method which comprises (1) extruding a viscous, water-coagulable solution of a thermoplastic product of polymerization of a polymerizable mass comprising at least 85% by weight of acrylonitrile, said polymerization product having a molecular weight within the range of 15,000 to 300,000 as calculated from viscosity measurements using the Staudinger equation, being dissolved in a concentrated aqueous solution of a water-soluble thiocyanate and constituting from 7 to 20% by weight of the said solution; (2) immediately after extrusion immersing the extruded mass in a liquid coagulant comprising water, said coagulant being at a temperature not higher than +10° C., thereby to precipitate the said polymerization product in the form of a stretchable gel; and (3) stretching the said gel in the presence of moisture and at a temperature within the range of 70° C. to 110° C.

21. The method which comprises (1) heating a water-coagulable solution of a thermoplastic product of polymerization comprising at least 85% by weight of acrylonitrile at a temperature within the range of 60° C. to 100° C., said polymerization product having a molecular weight of 35,000 to 300,000 as calculated from viscosity measurements using the Staudinger equation and being dissolved in a concentrated aqueous solution of sodium thiocyanate, and the said water-coagulable solution of the said polymerization product having a viscosity within the range of from 10 seconds to 500 seconds as determined by measuring the time in seconds for a Monel metal ball having a diameter of ⅛ inch to fall through 20 cm. of the solution at 61° C.; (2) extruding the water-coagulable solution of the said polymerization product, while thus being heated, in the form of a filament; (3) immediately after extrusion immersing the extruded filament in an aqueous coagulating bath maintained at a temperature within the range of −15° C. to +10° C. thereby to precipitate the said polymerization product in the form of a stretchable, water-swollen filament; and (4) stretching the said filament not less than 100% while passing through water maintained at a temperature ranging between 70° C. and 100° C.

22. The method which comprises (1) extruding, in the form of a filament, a viscous, water-coagulable solution of a thermoplastic product of polymerization of a polymerizable mass comprising not less than 85% by weight of acrylonitrile, said polymerization product being dissolved in a concentrated aqueous solution of a water-soluble thiocyanate and constituting from 7 to 20% by weight of the said solution, and the said water-coagulable solution of the said polymerization product having a viscosity within the range of from 10 seconds to 500 seconds, as determined by measuring the time in seconds for a Monel metal ball having a diameter of ⅛ inch to fall through 20 cm. of the solution at 61° C., and being heated to a temperature within the range of from 60° C. to 100° C. immediately prior to extrusion; (2) immediately after extrusion immersing the extruded filament in a liquid coagulating bath comprising water maintained at a temperature within the range of 0° C. to +5° C. thereby to precipitate the said polymerization product in the form of a stretchable, water-swollen filament; and (3) stretching the said filament not less than 200% while passing through water maintained at a temperature within the range of from 90° C. to 100° C.

23. The method of producing a synthetic fiber which includes the steps of extruding, in the form of a fiber, a viscous water-coagulable solution of a thermoplastic product of polymerization of a polymerizable mass comprising at least about 85% by weight of acrylonitrile, said polymerization product having a molecular weight within the range of about 40,000 to about 150,000 as calculated from viscosity measurements using the Staudinger equation and being dissolved in a concentrated aqueous solution of sodium thiocyanate; immediately after extrusion immersing the extruded mass in a liquid coagulant comprising mainly water, said coagulant being at a temperature not higher than +5° C., thereby to obtain a tough, stretchable, gelled fiber; elongating the said gelled fiber from 200% to 2000% whereby the molecules of the polymerization product are oriented along the fiber axis; and drying the elongated, gelled fiber.

ARTHUR CRESSWELL.

REFERENCES CITED

The following references are of record in the file of this patent:

UNITED STATES PATENTS

| Number | Name | Date |
|---|---|---|
| 2,140,921 | Rein | Dec. 20, 1938 |
| 2,265,283 | Herrmann | Dec. 9, 1941 |
| 2,354,744 | Dreyfus | Aug. 1, 1944 |
| 2,404,714 | Latham | July 23, 1946 |